A. W. McAULY.
ELECTRIC BRAKE.
APPLICATION FILED JAN. 26, 1920.

1,407,207.

Patented Feb. 21, 1922.
2 SHEETS—SHEET 1.

INVENTOR.
Arthur W. McAuly
BY Munday, Clarke &
Carpenter
ATTORNEYS

A. W. McAULY.
ELECTRIC BRAKE.
APPLICATION FILED JAN. 26, 1920.
1,407,207.
Patented Feb. 21, 1922.
2 SHEETS—SHEET 2.
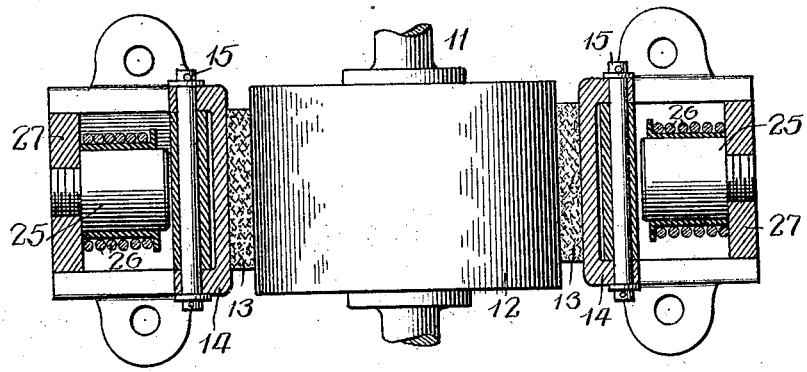
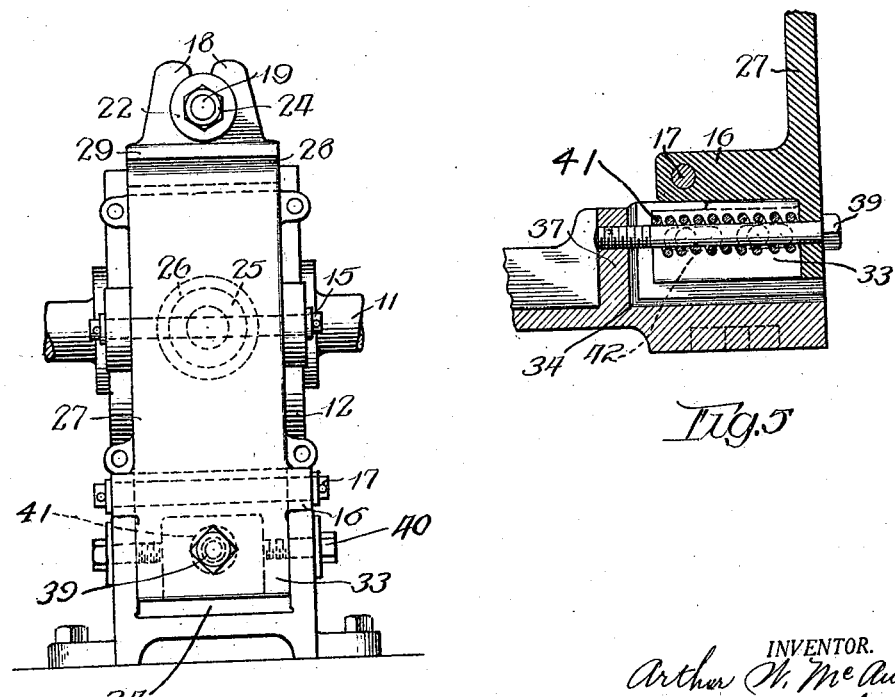
INVENTOR.
Arthur W. McAuly
BY Munday, Clarke
Carpenter.
ATTORNEYS

UNITED STATES PATENT OFFICE.

ARTHUR W. McAULY, OF OAKMONT, PENNSYLVANIA.

ELECTRIC BRAKE.

1,407,207.  Specification of Letters Patent.  Patented Feb. 21, 1922.

Application filed January 26, 1920. Serial No. 354,138.

*To all whom it may concern:*

Be it known that I, ARTHUR W. McAULY, a citizen of the United States, residing in Oakmont, in the county of Allegheny and State of Pennsylvania, have invented a new and useful Improvement in Electric Brakes, of which the following is a specification.

This invention relates in general to electric brakes and has more particular reference to brakes of this character wherein the braking action is performed by brake shoes acting against opposite sides of a brake drum.

As is well known springs or weights are usually provided to force the shoes into braking engagement with the drum and in electrical brakes magnetic means are employed to act in opposition to the weights or springs to release the brake and hold it in off position. Prior to my present invention most of the magnetic means employed has consisted of a single magnet which by the movement of its armature acted through a system of levers to apply the releasing force to diametrically opposite brake shoes. This arrangement required a considerable movement of the armature of the magnet and since the magnetic force felt by the armatures varies inversely as the square of the distance through which such force must act the springs or weights used were relatively light.

My present invention has for a principal object the provision of an electric brake wherein the movement of the brake shoes from fully on to fully off position will be relatively slight and wherein the movement of the armatures will also be relatively slight and consequently the distance through which the magnetic force must act in attracting the armatures will also be slight with the result that heavier and more powerful springs or weights may be used in connection with the available magnetic force.

Another important object of this invention is the provision of an electric brake, the parts of which will be so constructed and arranged that a thick brake lining may be used, the arrangement being such that adjustment may be readily effected as wear occurs.

Another important object of the invention is the construction and arrangement of the several parts of an electric brake of the character described so that the extent of wear and the need for adjustment will be always apparent by merely glancing at the apparatus and without requiring any of the parts to be removed for the purpose of inspection.

Another important object of the invention is the provision of an electric brake wherein the clearance between the shoes and drum at all points may be readily equalized and the possibility of uneven wear of the lining thus materially reduced.

A further object of the invention is the provision of an electric brake that will be readily adjustable to compensate for wear of the parts of the apparatus other than the brake lining.

A still further and important object of the invention is the provision of an electric brake that will permit of the removal of the drum and shaft on which it is mounted with a minimum disassembling of the brake and other parts.

A still further and important object of the invention is the provision of an electric brake of extremely simple construction, all the parts being in readily accessible position and proportioned so as to provide great mechanical strength.

Another object of my invention is the construction and arrangement of the magnetic means for releasing the brake and the mounting therefor in such manner that the magnetic coils need not accurately conform to the housing or frame in which it is placed and will not be subjected to wear due to its sliding back and forth in such frame. Otherwise stated the invention has for an object the provision of magnetic coils so protected that wear of the insulation and consequent grounding will be obviated.

Another object of the invention is the provision of an electric brake so constructed and arranged that repairs, replacement and readjustment may be readily made.

Other objects and advantages of the invention will be apparent as it is better understood from the following description, which taken in connection with the accompanying drawings discloses a preferred embodiment thereof.

On the drawings,

Fig. 3 is a section taken substantially on the line 3—3 of Fig. 1;

Fig. 4 is a side elevation of the same;

Fig. 5 is a partial detail section on an enlarged scale showing the adjustable connection between each magnet support and the base.

Figure 1:
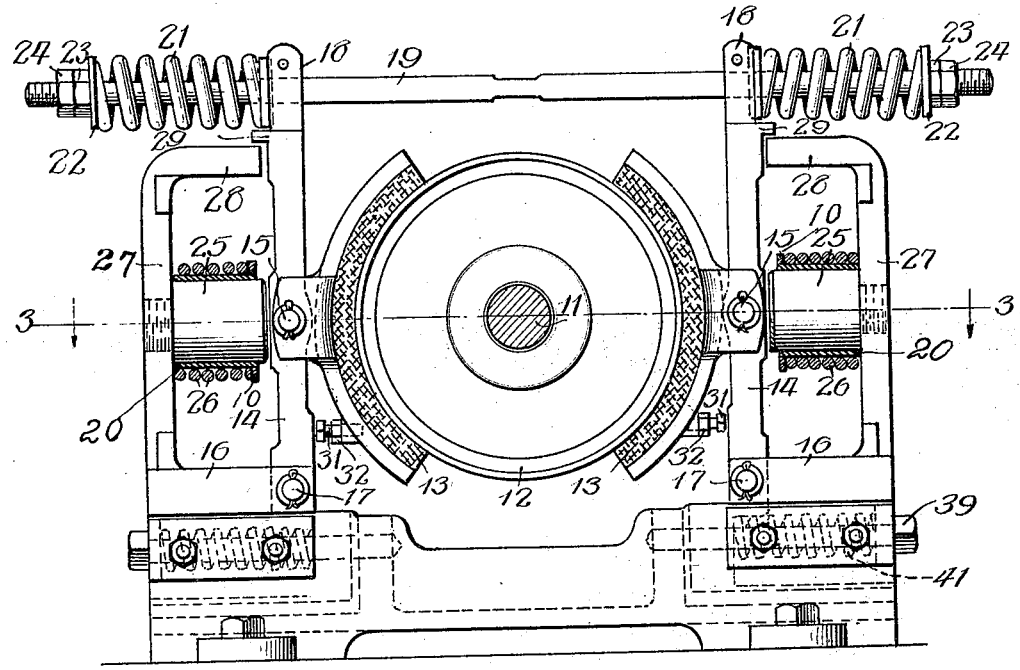
Figure 1 is an end elevation of an electric brake embodying my present invention.
Figure 2:
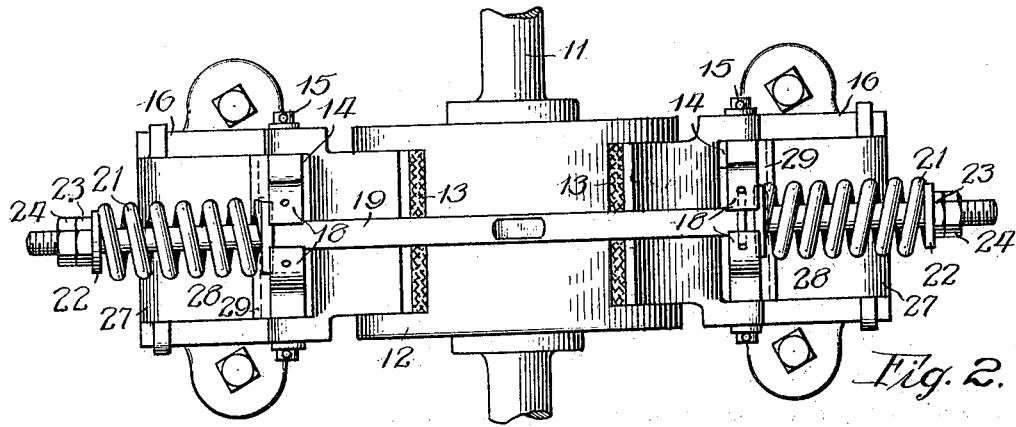
Fig. 2 is a top plan view thereof.

For the purpose of illustrating my invention I have shown on the drawing an apparatus in which it is embodied. The drawing discloses a part of a shaft 11 which may be the motor shaft or which may be taken to be part of any suitable apparatus, as for example an electric crane, said shaft having bearings as the other parts of the apparatus may render convenient. The shaft 11 carries a brake drum 12 of any usual or preferred construction.

Two brake shoes 13 of arcuate form are provided at opposite sides of the brake drum and each is mounted upon a lever 14 by pivot pins 15. The levers 14 are pivotally mounted upon slides 16 by pins 17. At the top, the levers 14 are slotted or bifurcated at 18 to receive a rod 19. On the ends of this rod are positioned springs 21 bearing at their inner ends against the levers 14 and at their outer ends against washers 22 held in place by nuts 23 threaded on the ends of the rod 19. Lock nuts 24 are preferably also provided. The springs normally force the levers toward each other to in turn force the brake shoes toward the drum and apply the brakes.

Electrical means are provided to move the shoes against the force of the springs away from the drum to release the brake and hold it in released position. This electrical means comprises an electromagnet located at and behind each brake shoe and in position to attract the lever 14 which acts as an armature for the magnet. Each magnet comprises a core 25 upon which is wound coils of copper wire 26. The coil is carried in and supported by a yoke 27 forming a part of the slide 16. This yoke extends up and over the magnet in the form of an arm 28 to adjacent the appropriate lever 14 upon which is provided lifts 29 extending over the end of the arm and spaced slightly therefrom.

The magnet coils are wound upon insulating tubes 20 having outturned flanges 10 at the outer ends, the whole being readily removable from each core as a unit. This arrangement prevents removing of the magnets and the action in service from producing wear of the insulation. The flanges 10 are preferably separate from the tubes and slide thereon to adjust for length of coil.

The coils of the magnet are preferably in series with a motor driving the apparatus of which the shaft 11 forms a part when such a motor is employed; and when it is desired to release the brake and cause the shaft 11 to be rotated the application of current will magnetize the coils of the magnet and attract the armature levers 14 which carry the brake shoe. It will be manifest that the movement of the armatures at the points at which the brake shoes are attached to them is very slight. On this account springs 21 may be heavy since the magnetic pull needed to overcome them acts through a short space and is not reduced greatly in its effect.

It will be apparent that the shaft and drum may be readily removed by merely first removing the springs and rod 19, the pivotal mountings of the brake shoes permitting them to move out of the way. Moreover it will also be noted that lowering of the shaft and the drum as a result of wear in the bearings or readjustment of them will not appreciably effect the character of the engagement between the shoes and the drum. In order that there shall be an even clearance between the drum and shoes when the brake is off I provide a set screw 31 extending into the back of each shoe and adapted to engage the forward space of its lever 14. A lock nut 32 is preferably provided to hold the set screw in adjusted relation.

Means are provided for adjusting the brake shoes toward the drum as a brake shoe lining wears. These means in the present instance are the slides 16. Each slide is provided with a pair of arms or lugs 33 extending down into registration with a recess 34 slidably fitting therein. At the inner end of this slide is a vertically extending web 37 at the inside of the recess 34. A cap screw 39 is arranged through the lug 33 and threaded through the vertical web 37 at the inner end of the recess in the main support. Extending through slotted recesses in the sides of the main support are lateral clamping screws 40 screwed into the lugs 33 of the slides 16 and adapted to clamp said lugs and the slides 16 fixedly to the recessed frame member. By loosening these clamping screws 40 and turning the screw 39 the slide 16 may be moved inwardly or outwardly with respect to the recess of the main support, its outward movement being effected by a spring 41 as the bolt 39 is loosened. The springs 41 are provided to hold the slides 16 as far separated as the position of the cap screws 39 will permit. Adjustment is effected by adjusting the cap screw to move the yokes in and out. This arrangement permits the use of extremely light brake linings for the brake shoes and the making of adjustment as they wear down. It will be noted that the movement of the brake shoes in the adjustment for wear of the brake lining is accompanied by bodily movement of the armatures and magnets so that the gap between each armature and its magnet is unaffected.

The extent of movement of each brake shoe is exactly equal to the space between the armature and magnet when the brake is applied and since this space is always visible it will indicate the extent of wear so that need for adjustment will always be apparent.

The brake embodying my invention and shown on the drawing may be used with reduced efficiency should one of the brake shoes be out of use. The squared construction at the bottom of each armature lever limits the brake applying movement of the armature so that operation may still be accomplished when one brake shoe is absent.

It will also be apparent that the mounting of the armatures in the manner described reduces materially the wear on pivot pins 17. The whole construction is simple and the parts all easily accessible for repair, replacement and readjustment.

Figure 6:
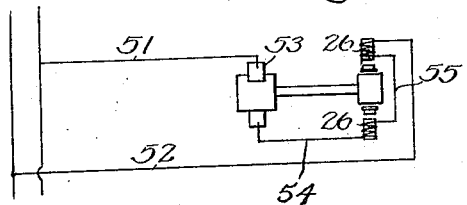
Fig. 6 is a diagrammatic showing of the wiring.

Fig. 6 shows a possible simple wiring diagram. Wires 51 and 52 indicate line or service wires and may be considered a source of current. Wire 51 is connected to one side of the motor indicated at 53, and the other side of this motor is connected by wire 54 with one side of one coil 26. Wire 55 connects the other side of this coil with one side of the other coil 26 and the other side of this coil is in turn connected with wire 52 so that the motor and the two coils are arranged in series.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an electric brake, the combination of a brake drum, pivotally mounted brake shoes adapted to bear thereagainst in braking, means normally forcing said shoes against said drum, electrical means for withdrawing said shoes, and means for bodily adjusting said shoes and said electrical means radially of the drum to compensate for wear of the brake shoe lining.

2. In an electric brake, the combination of a brake drum, pivotally mounted brake shoes adapted to bear thereagainst in breaking, means normally forcing said shoes against said drum, electrical means for withdrawing said shoes, and means for bodily adjusting said shoes and said electrical means to compensate for wear of the brake shoe lining in a straight line movement radially toward and from said drum.

3. In an electric brake in combination: a frame, a braking drum, magnets mounted in said frame, armature levers pivotally mounted relative to said frame and adjustable towards and from said drum and cooperating with said magnets, brake shoes pivotally connected with said armature levers, brake actuating means carried by said levers to normally maintain said shoes in braking engagement with said drum, said brake actuating means being detachable to effect the removal of said drum from said brake shoes and said frame without disturbing the braking adjustment of said armature levers.

4. In an electric brake in combination: a frame, a braking drum, magnets mounted in said frame, armature levers pivotally mounted in said frame and cooperating with said magnets, brake shoes pivotally connected with said armature levers, means carried by said levers to normally maintain said shoes in braking engagement with said drum, said armature levers and said magnets being adjustable horizontally towards and from said drum to compensate for wear upon said brake shoes.

5. In an electric brake in combination: a frame, a braking drum, a pair of armature levers pivotally mounted relative to said frame on opposite sides of the drum, said pivots being adjustable towards and from each other and said drum, a pair of brake shoes pivotally mounted on said armature levers on opposite sides of said drum, means carried by each of said levers to normally maintain said shoes with braking pressure on said drum, and a pair of magnets carried by said frame and arranged each to operate one of the armature levers.

6. In an electric brake in combination: a frame, a braking drum, magnets mounted in said frame, armature levers pivotally mounted relative to said frame and adjustable towards and from said drum and cooperating with said magnets, brake shoes pivotally connected with said armature levers, means carried by said levers to normally maintain said shoes in braking engagement with said drum, said pivotal connections of the brake shoes with the armature levers being detachable to effect the removal of said brake shoes without disturbing the braking adjustment of said armature levers.

7. In an electric brake, in combination with a frame: a brake drum, a pair of brake shoes adapted to bear against said drum in braking, a pair of armature levers pivotally mounted on said frame and having a pivotal connection with said brake shoes, mechanical means carried by the upper ends of said armature levers adapted to normally maintain said levers and brake shoes in braking engagement with said drum, and magnets mounted in said frame adapted when energized to withdraw said levers and braking shoes from braking position, said armature levers and said magnets being mounted for horizontal adjustment together in said frame to decrease the distance between said levers and said drum, without decreasing the distance between said levers and said magnets, to compensate for wear upon said brake shoes.

ARTHUR W. McAULY.